(12) United States Patent
Whiteman et al.

(10) Patent No.: US 12,139,886 B2
(45) Date of Patent: Nov. 12, 2024

(54) INTEGRATED VEHICLE AND BATTERY THERMAL MANAGEMENT OF AN ELECTRIC EXCAVATOR

(71) Applicant: Deere & Company, Moline, IL (US)

(72) Inventors: Steven R. Whiteman, Dubuque, IA (US); Zakir H. Faruquee, Pune (IN); Nitin Dewangan, Durg (IN); Manish M. Kute, Dubuque, IA (US); Douglas T. Corbett, Dubuque, IA (US); Kishan Trivedi, Jamnagar (IN)

(73) Assignee: Deere & Company, Moline, IL (US)

( * ) Notice: Subject to any disclaimer, the term of this patent is extended or adjusted under 35 U.S.C. 154(b) by 282 days.

(21) Appl. No.: 17/745,049

(22) Filed: May 16, 2022

(65) Prior Publication Data
US 2023/0366175 A1 Nov. 16, 2023

(51) Int. Cl.
*E02F 9/20* (2006.01)
*B60L 58/26* (2019.01)

(52) U.S. Cl.
CPC .............. *E02F 9/207* (2013.01); *B60L 58/26* (2019.02); *B60L 2200/40* (2013.01); *B60L 2240/545* (2013.01)

(58) Field of Classification Search
CPC ........... E02F 9/207; E02F 3/32; E02F 9/0858; B60L 58/26; B60L 2200/40; B60L 2240/545; B60L 1/003; B60L 2240/34; B60L 2240/36; B60L 2240/662; B60H 1/00278; B60H 1/00271; B60H 2001/00307; H01M 10/60; H01M 6/5038
See application file for complete search history.

(56) References Cited

U.S. PATENT DOCUMENTS

| 9,349,532 | B2 | 5/2016 | Kim |
| 11,541,719 | B1* | 1/2023 | Richardson ........ B60H 1/00485 |
| 2020/0254844 | A1* | 8/2020 | Lopez Hernandez ...................... F01P 11/028 |
| 2021/0370745 | A1* | 12/2021 | Carlson ..................... B60L 1/02 |
| 2021/0379959 | A1* | 12/2021 | Smith .................... B60H 1/323 |

(Continued)

FOREIGN PATENT DOCUMENTS

| CN | 109367375 A | * | 2/2019 |
| CN | 215869536 U |   | 2/2022 |
| KR | 20120110369 A |   | 10/2012 |

OTHER PUBLICATIONS

Pdf is translation of foreign reference CN 109367375 (Year: 2019).*

(Continued)

*Primary Examiner* — Len Tran
*Assistant Examiner* — Kamran Tavakoldavani
(74) *Attorney, Agent, or Firm* — Lucian Wayne Beavers; Patterson Intellectual Property Law, PC

(57) ABSTRACT

An integrated vehicle and battery thermal management system for an electric work machine may include a battery module, a radiator, a fan to move air across the radiator, a battery coolant loop including a coolant pump, a refrigerant loop including a compressor, and a chiller providing heat transfer from the battery coolant loop to the refrigerant loop. A controller is operably connected to the coolant pump, the compressor and the fan and is configured to provide a passive cooling mode, a semi-passive cooling mode, and an active cooling mode, dependent upon monitored temperatures in the system.

18 Claims, 6 Drawing Sheets

(56) References Cited

U.S. PATENT DOCUMENTS

2022/0324294 A1\* 10/2022 Kim .................. B60H 1/00921
2022/0355645 A1\* 11/2022 Jeong ................ B60H 1/00278

OTHER PUBLICATIONS

"Combined Fluid Loop Thermal Management for Electric Drive Vehicle Range Improvement", Leighton, SAE (Apr. 21, 2015).
"Active cooling based battery thermal management using composite phase change materials", Zhao et al., (Aug. 22, 2018).
Audi Media Center, "Battery and thermal management", at least as early as Apr. 8, 2022.

\* cited by examiner

INTEGRATED VEHICLE AND BATTERY THERMAL MANAGEMENT OF AN ELECTRIC EXCAVATOR

FIELD OF THE DISCLOSURE

The present disclosure relates to systems for integrated vehicle and battery thermal management of an electrically powered work machine, especially an electric excavator.

BACKGROUND

The interest in energy saving, and eco-friendly products is ever growing, and consequently vehicles of hybrid and electric form have become more prevalent in the automobile industry. For the same reasons there is a growing push for this technology be utilized to power off highway vehicles. However, heavy workload actions such as excavation, load carrying, and carving of the ground surface require large amounts of power, hence a larger lithium-ion battery.

The management of the cooling systems for such electric work machines provides challenges different from those encountered in the automobile industry. In addition to having much larger battery requirements and very different vehicle architectures than those of the automobile industry, there are often very harsh working environments. Also, such electric work vehicles often operate in a stationary location and when they do move they move at very low speeds, typically below 10 mph and thus cannot take advantage of cooling due to the speed of the ambient air stream moving past the vehicle as an automobile can.

Accordingly, there is a need for improved systems for managing the cooling of the batteries of such electric work machines and for integration of the battery cooling with other heating and cooling systems of the electric work machine.

SUMMARY OF THE DISCLOSURE

In one embodiment an integrated vehicle and battery thermal management system for an electric work machine may include a battery module including at least one battery and including an air passage configured to allow natural convection cooling of the battery by ambient air. The system may further include a radiator including an internal flow path. The system may further include a chiller including a first flow path and a second flow path in heat exchange relation with each other. A battery coolant loop may be configured to flow a battery coolant in heat exchange relation with the battery and through the internal flow path of the radiator and the first flow path of the chiller, the battery coolant loop including a coolant pump for circulating the battery coolant through the battery coolant loop. A refrigerant loop may be configured to flow a refrigerant through the second flow path of the chiller, the refrigerant loop including a compressor for circulating the refrigerant through the refrigerant loop. A fan may be configured to move ambient air across the radiator in heat exchange relation with the battery coolant in the internal flow path of the radiator. A controller may be operably connected to the coolant pump, the compressor and the fan, and the controller may be configured to provide:
 a passive cooling mode including natural convection cooling of the battery by ambient air;
 a semi-passive cooling mode in which the fan is operative to provide forced convection cooling by passing ambient air across the radiator, and in which the coolant pump is operative to move the battery coolant through the internal flow path of the radiator to cool the battery coolant; and
 an active cooling mode in which the compressor is operative to circulate the refrigerant through the second flow path of the chiller, and in which the coolant pump is operative to move the battery coolant through the first flow path of the chiller to cool the battery coolant.

In a further embodiment an electric excavator may include a undercarriage, an main frame mounted on the undercarriage to be pivotable about a vertical axis relative to the undercarriage, an excavator arm extending from a forward end of the main frame, and an operator's cabin located on the main frame. At least one battery may be located in a battery housing. The battery housing may include an air passage configured to communicate the battery with ambient air to cool the battery. The battery housing may be located on the main frame rearward of the operator's cabin and extend across a width of the main frame. The battery housing may include a first housing end and a second housing end. A fan may be located between the battery and the first housing end to move ambient air through at least a portion of the air passage. The second housing end may include an end opening to the air passage, and the battery housing may include an upper air opening to the air passage closer to the first housing end than to the second housing end.

Numerous objects, features and advantages of the present invention will be readily apparent to those skilled in the art upon a review of following description in conjunction with the accompanying drawings.

DETAILED DESCRIPTION

Figure 1:
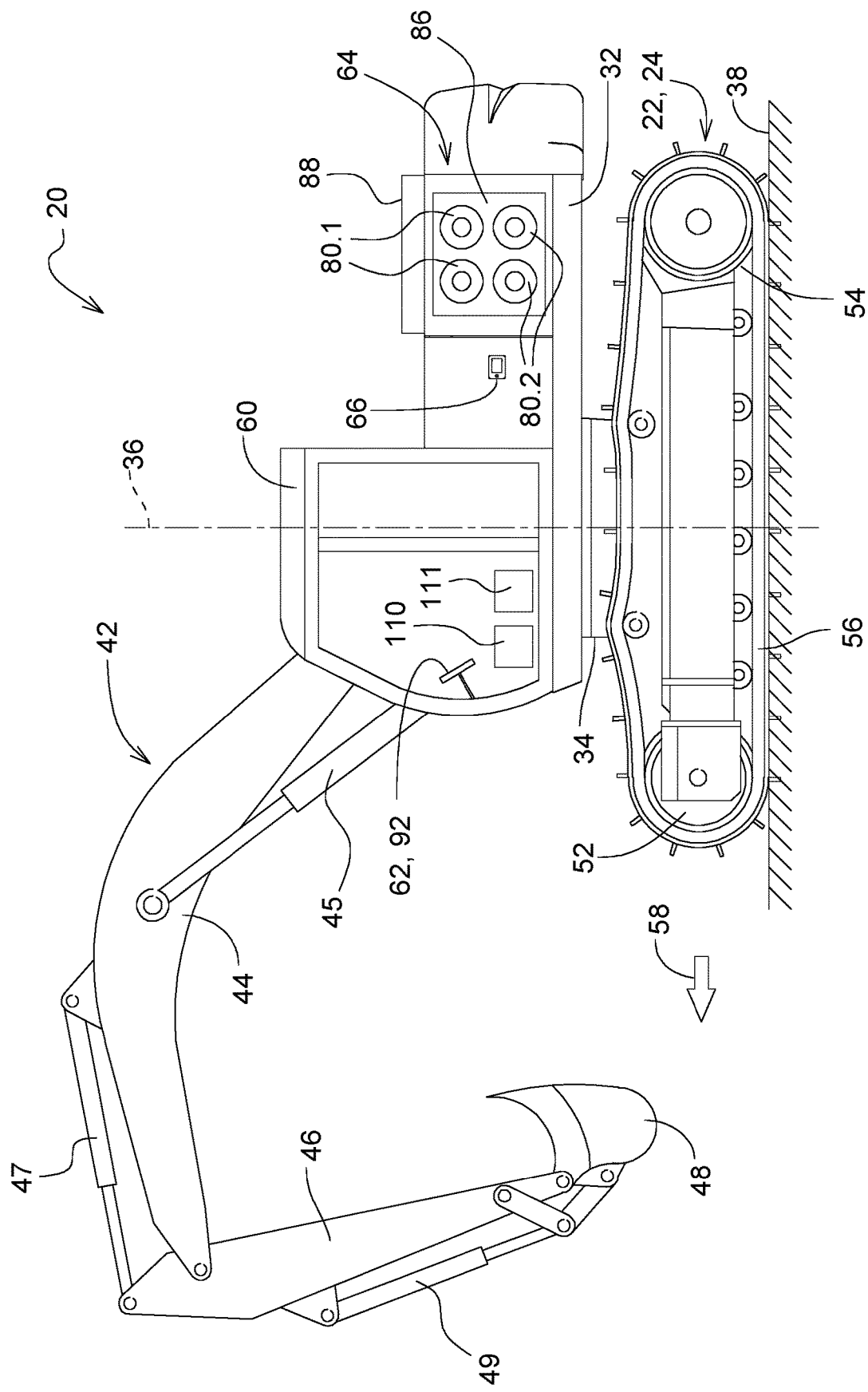
FIG. 1 is a schematic left side elevation view of an electric work machine, in this case an electric excavator.
Figure 2:
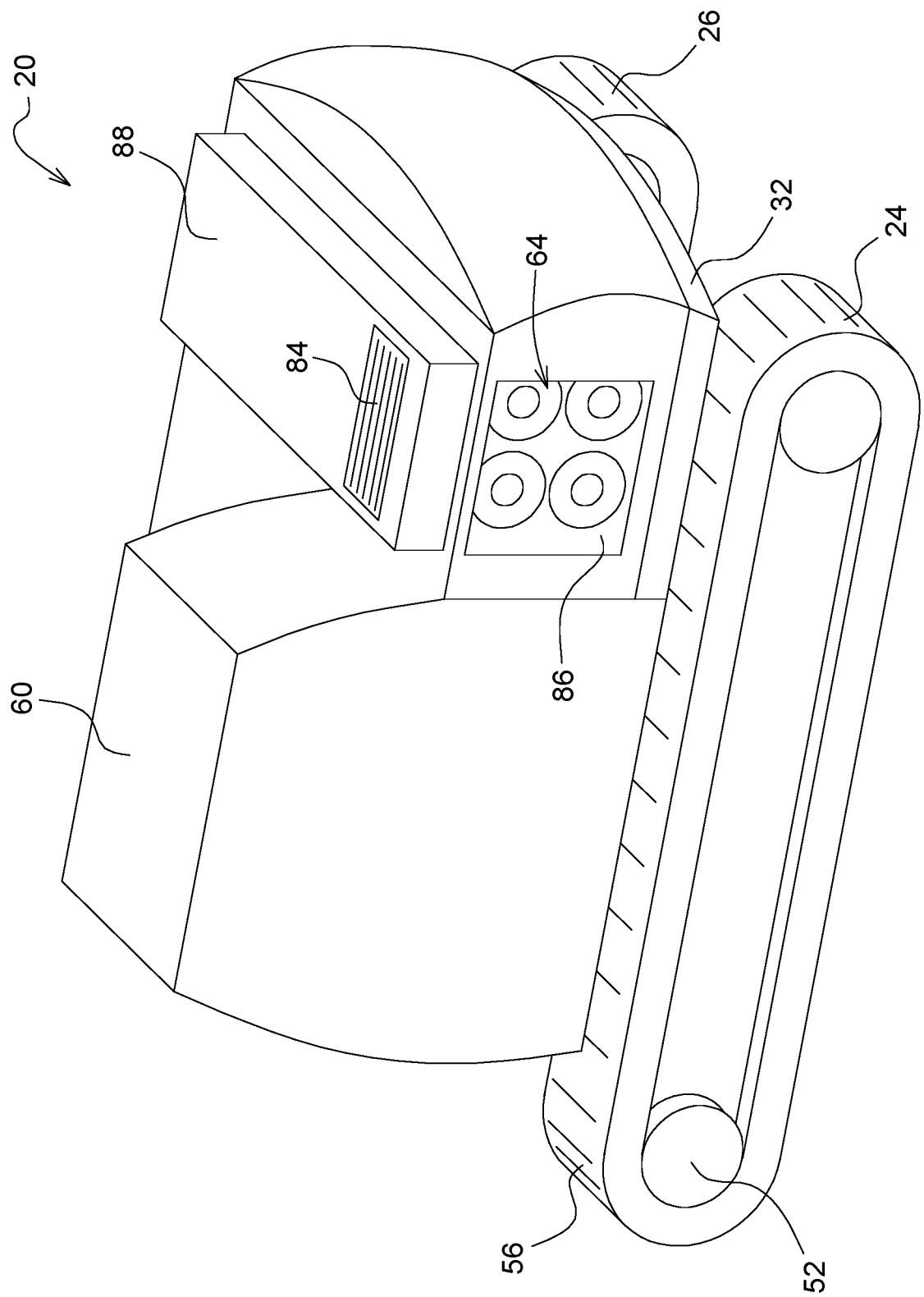
FIG. 2 is a left rear perspective view of the rear portions of the electric work machine of FIG. 1.

Referring now to the drawings and particularly to FIGS. 1 and 2, an electric work machine is shown and generally designated by the number 20. FIG. 1 shows the electric work machine as an electrically powered tracked excavator machine 20. The systems disclosed herein are applicable to excavator machines, feller buncher machines, front shovel machines, and other electrically powered work machines which may be used in the construction and forestry industry.

The applicable machines are identifiable by their usefulness in an offroad environment where the machine typically operates in a near stationary manner, and which when travelling typically do so at relatively low speeds, e.g. less than 10 mph. The applicable machines are most often tracked vehicles as opposed to wheeled vehicles.

The electric work machine 20 includes an undercarriage 22 including first and second ground engaging units 24 and 26 including first and second hydraulic travel motors 28 and 30 for driving the first and second ground engaging units 24 and 26, respectively.

A main frame 32 is supported from the undercarriage 22 by a swing bearing 34 such that the main frame 32 is pivotable about a pivot axis 36 relative to the undercarriage. The pivot axis 36 is substantially vertical when a ground surface 38 engaged by the ground engaging units 24 and 26 is substantially horizontal. A hydraulic swing motor 40 is configured to pivot the main frame 32 on the swing bearing 34 about the pivot axis 36 relative to the undercarriage 22.

The swing bearing 34 includes an upper ring configured to be bolted to the underside of the main frame 32, and a lower ring configured to be bolted to the undercarriage 22. The lower ring includes an internally toothed ring gear. The swing motor 40 is mounted on the main frame 32 and drives a pinion gear 41 which extends downward into engagement with the internally toothed ring gear. Operation of the swing motor 40 drives the pinion gear which results in pivoting movement of the main frame 32 on the swing bearing 34 about the pivot axis 36 relative to the undercarriage 22.

A boom assembly 42 includes a boom 44, an arm 46 pivotally connected to the boom 44, and a working tool 48. Hydraulic actuators 45, 47 and 49 may control the articulated motion of the boom 44, arm 46 and working tool 48, respectively. The boom 44 is pivotally attached to the main frame 32 to pivot about a generally horizontal axis relative to the main frame 32. The working tool in this embodiment is an excavator shovel 48 which is pivotally connected to the arm 46.

In the embodiment of FIG. 1 the first and second ground engaging units 24 and 26 are tracked ground engaging units. Each of the tracked ground engaging units includes a front idler 52, a drive sprocket 54, and a track chain 56 extending around the front idler 52 and the drive sprocket 54. The travel motor 28 or 30 of each tracked ground engaging unit 24 or 26 drives its respective drive sprocket 54. Each tracked ground engaging unit has a forward traveling direction 58 defined from the drive sprocket 54 toward the front idler 52. The forward traveling direction 58 of the tracked ground engaging units also defines a forward traveling direction 58 of the undercarriage 22 and thus of the electric work machine 20.

An operator's cab 60 may be located on the main frame 32. The operator's cab 60 and the boom assembly 42 may both be mounted on the main frame so that the operator's cab 60 faces in a working direction of the boom assembly. A control station 62 may be located in the operator's cab 60.

Also mounted on the main frame 32 is a battery module 64 for powering the electric work machine 20. The battery module 64 may provide power through a power electronics component 65 to an electric motor 66 driving a hydraulic pump 68 to provide hydraulic power to the various operating systems of the electric work machine 20. The battery module 64, the power electronics component 65, the electric motor 66, the hydraulic pump 68 and the related hydraulic power system for the electric work machine 20 are illustrated schematically in FIG. 3 which is further described below.

Figure 3:
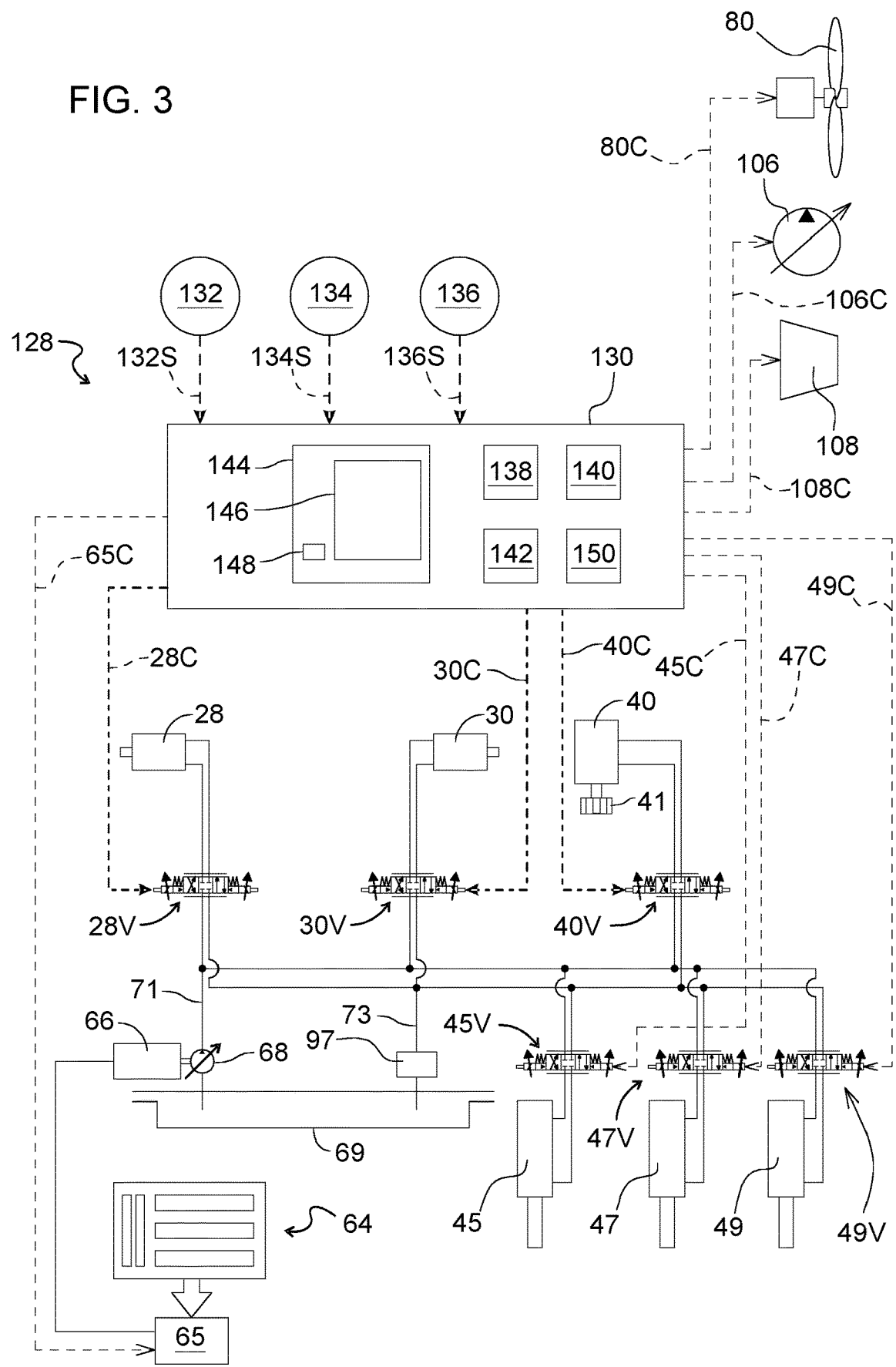
FIG. 3 schematically illustrates one embodiment of the electric/hydraulic power supply system of the electric work machine along with the controller and various inputs and outputs to and from the controller.

FIG. 3 schematically illustrates one embodiment of the electric/hydraulic power supply system of the electric work machine 20 along with a controller 130. In the embodiment illustrated in FIG. 3 electric power from the battery module 64 drives the main electric motor 66 which drives the hydraulic pump 68 which provides hydraulic power to the various hydraulic motors and actuators including travel motors 28 and 30, swing motor 40, and the hydraulic cylinders 45, 47 and 49. The hydraulic pump 68 may draw hydraulic fluid from a reservoir 69 and provide pressurized hydraulic fluid to hydraulic fluid supply line 71. Electric/hydraulic control valves 28V, 30V, 40V, 45V, 47V and 49V associated with the motors and actuators 28, 30, 40, 45, 47 and 49, respectively may be controlled by the controller 130 as further described below to control the flow of hydraulic fluid to the motor or actuator as needed. Spent hydraulic fluid is returned to hydraulic fluid return line 73 which returns it to the reservoir 69.

Electric power may also be provided from battery module 64 to various electrically powered accessories of the electric work machine, such as the electric heater 124 discussed below. In alternative embodiments any one or more of the hydraulic motors and hydraulic cylinders may be replaced by electrically powered actuators which are directly powered by the battery module 64.

The power electronics component 65 may condition the electrical power from the batteries 74A-74C and control the flow of that power to the main electric motor 66 and other electrical accessories such as 122 and 124 under the control of controller 130 as further discussed below.

Figure 4A:
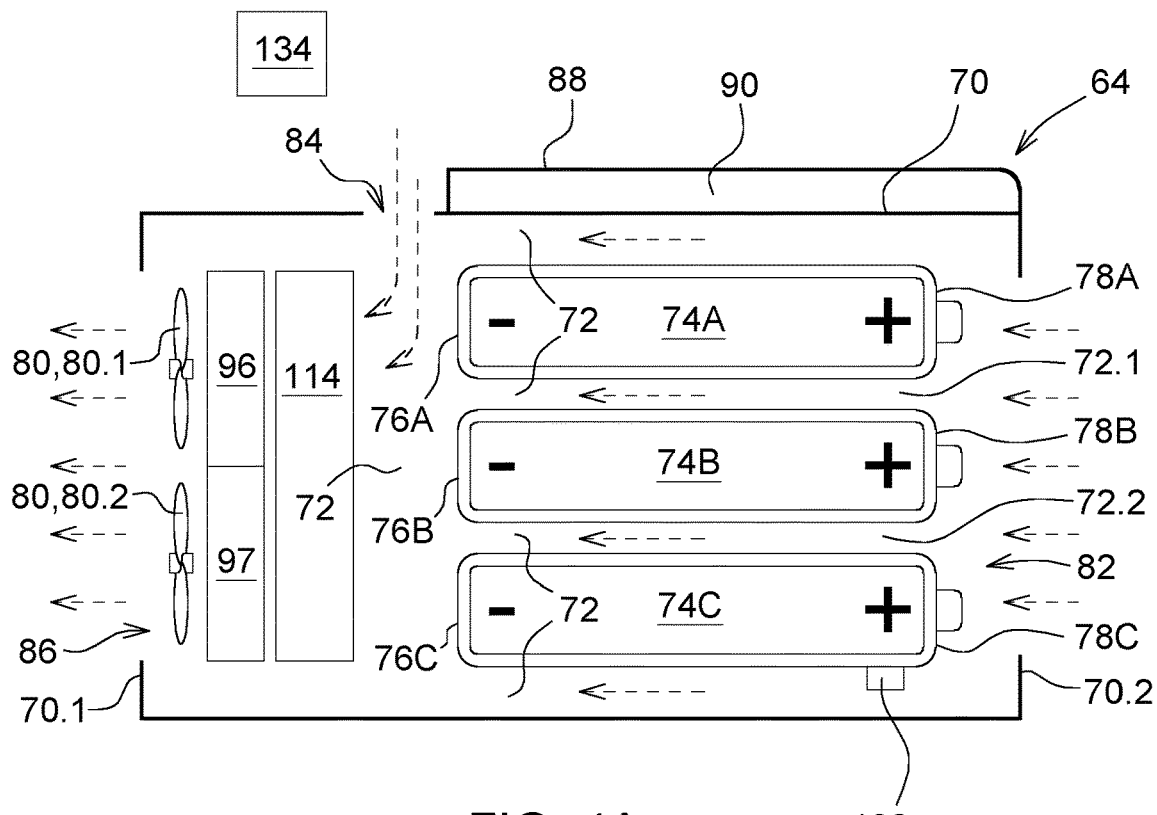
FIG. 4A is a schematic view of the battery module operating in a first semi-passive phase wherein forced convection cooling is provided by moving ambient air through the cooling passage in heat exchange relation with the batteries.
Figure 4B:
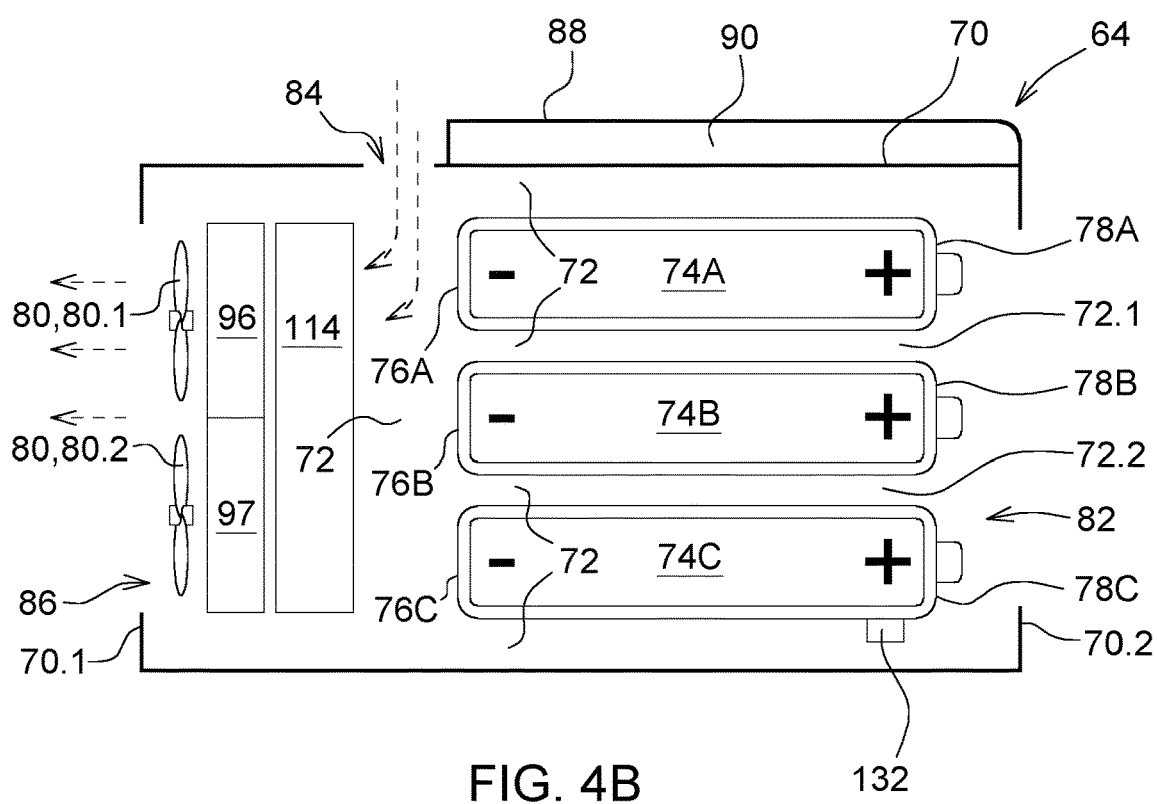
FIG. 4B is a schematic view similar to FIG. 4A, but showing a second semi-passive phase wherein a majority of the ambient air is moved directly to the radiator without moving through the cooling passage past the batteries.

As is schematically shown in FIGS. 4A and 4B the battery module 64 may include a battery housing 70 and a plurality of vertically stacked batteries 74A, 74B and 74C received in the battery housing 70. In another embodiment the "stack" of batteries may be re-oriented so that the "stack" is other than vertical. The batteries 74A-74C may be lithium-ion batteries which may have a typical operating temperature range of from 10 to 40 degrees C. at all ambient conditions.

The battery housing 70 may extend from a first housing end 70.1 to a second housing end 70.2. As seen in FIGS. 1 and 2 the battery housing may be located on the main frame 32 rearward of the operator's cabin 60 and extending across a width of the main frame 32. The first and second housing ends 70.1 and 70.2 may also be referred to as first and second module ends of the battery module 64. The batteries 74A-74C may extend lengthwise from first battery ends 76A-76C to second battery ends 78A-78C.

An air passage 72 is defined in the battery housing 70 and is configured to allow natural convection cooling of the batteries 74A-74C by ambient air flowing from outside of the housing 70. A fan 80 may be located between the batteries 74A-74C and the first housing end 70.1 to move ambient air through at least a portion of the air passage 72. The second housing end 70.2 may include an end opening 82 to the air passage 72. End opening 82 may also be referred to as a lower air opening 82. The lower air opening 82 may be closer to the second battery ends 78A-78C than to the first battery ends 76A-76C. The battery housing 70 may include an upper air opening 84 to the air passage 72, the upper air opening being closer to the first housing end 70.1 than to the second housing end 70.2. Portions 72.1 and 72.2 of the air passage 72 may extend generally horizontally between adjacent ones of the vertically stacked batteries 74A-74C. The fan 80 may pull ambient air through the end opening 82 and/or the upper air opening 84 through the air passage 72 and out an exhaust opening 86 of the battery housing 70. The fan 80 may be powered by individual electric motors associated with each of the fan blades.

The fan 80 may be located in a direction of the length of the batteries 74A-74C beyond the first battery ends 76A-76C and closer to the upper air opening 84 than to the lower air opening 82. The fan 80 may include an upper fan unit 80.1 and a lower fan unit 80.2. The fan 80 may include four fan blades a seen in FIGS. 1 and 2, with two of the fan blades providing the upper fan unit 80.1 and two of the fan blades providing the lower fan unit 80.2.

The battery module 64 may include a heat shield 88 mounted on the top of the battery housing 70 above the batteries 74A-74C to shield the batteries from direct solar radiation. The heat shield 88 may include a layer of phase change material (PCM) 90 configured to enhance cooling of the batteries 74A-74C. By placing a layer of PCM adjacent the batteries 74A-74C a large part of the heat generated by the batteries can be absorbed by the PCM without changing the temperature of the PCM. PCM's are substances with a high latent heat capacity, meaning that they are capable of storing and releasing large quantities of energy when they melt or solidify. When the PCM melts it stores energy as latent heat until it is completely molten. When temperatures around the PCM fall the PCM solidifies and recrystallizes. As the PCM begins to solidify the stored latent heat is released until the PCM is completely crystallized. During operation of the electric work machine 20 the layer 90 of PCM may absorb heat from the batteries 74A-74C and melt into a liquid form.

There are three main classes of PCM's: (1) inorganic metal salt hydrates; (2) paraffinic petrochemically derived PCM's; and (3) PCMs from other organic materials. One example of a suitable PCM is a copper fibre/paraffin composite as described in Zhao et al, "Active cooling based battery thermal management using composite phase change materials", 10th International Conference on Applied Energy (ICAE2018), 22-25 Aug. 2018, Hong Kong, China, the details of which are incorporated herein by reference.

Figure 5:
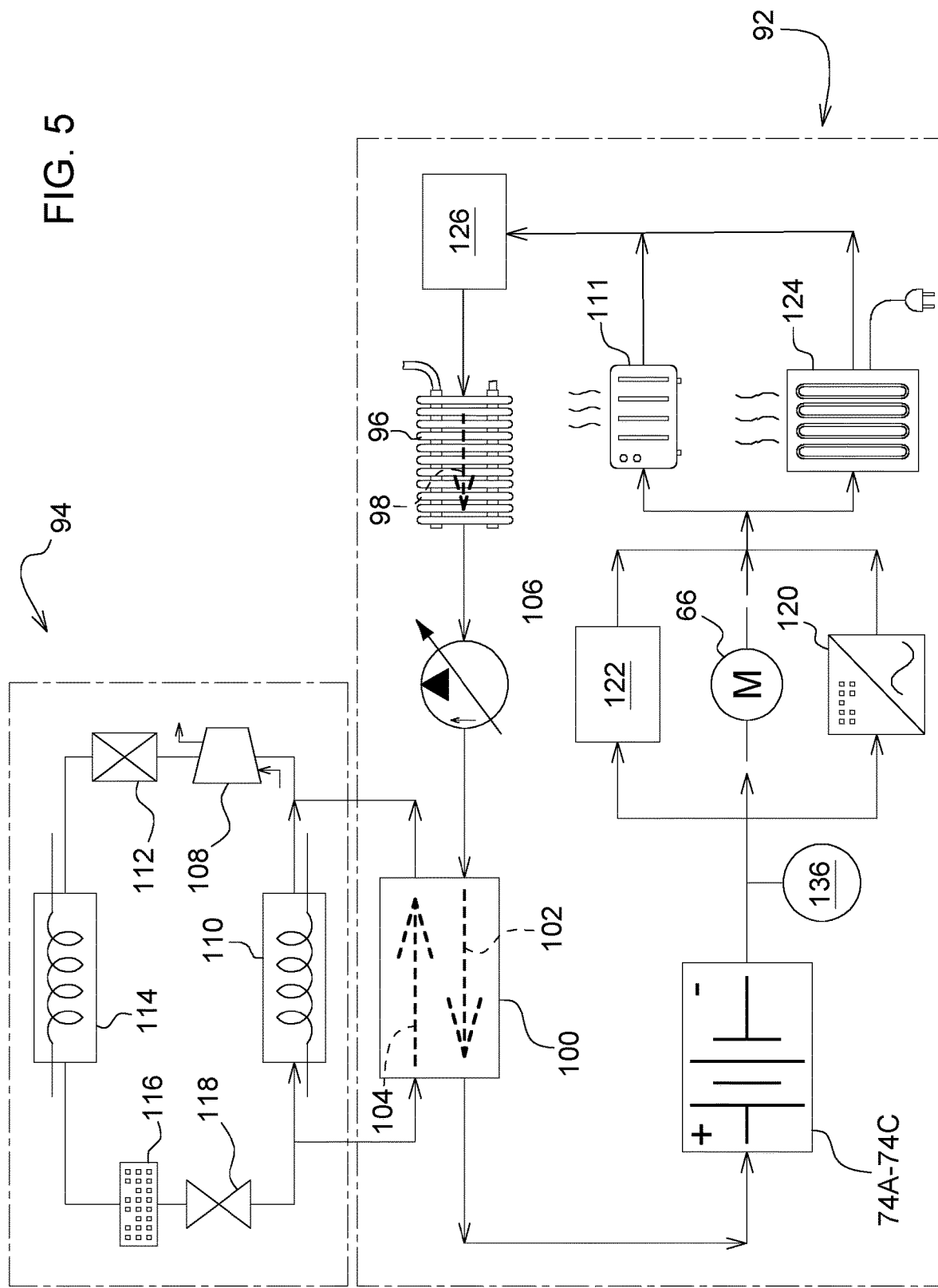
FIG. 5 is a schematic diagram of the coolant loop and the refrigerant loop.

FIG. 5 schematically illustrates a battery coolant loop 92 and a refrigerant loop 94 of the electric work machine 20.

A radiator 96 is disposed in the battery coolant loop 92 to aid in cooling the battery coolant. As seen in FIGS. 4A and 4B the radiator 96 may be located within the battery housing 70 between the upper air opening 84 and the fan 80, and more particularly between the upper air opening 84 and the upper fan unit 80.1. The fan 80 pulls ambient air across the external surface of the radiator 96 to cool the coolant flowing through an internal flow path 98 of the radiator 96 as schematically represented in FIG. 5. A hydraulic oil cooler 97 may also be located within the battery housing 70 between the upper air opening 84 and the fan 80. The hydraulic oil cooler 97 may cool hydraulic oil flowing through return line 73 as seen in FIG. 3.

A chiller 100 provides a heat exchange connection between the battery coolant loop 92 and the refrigerant loop 94. The chiller 100 includes a first flow path 102 and a second flow path 104 in heat exchange relation with each other. As can be seen in FIG. 5 the battery coolant loop 92 is configured to flow the battery coolant in heat exchange relation with the batteries 74A-74C and through the internal flow path 98 of the radiator 96 and the first flow path 102 of the chiller 100. The battery coolant loop includes a coolant pump 106 for circulating the battery coolant through the battery coolant loop 92. Coolant pump 106 may be driven by an electric motor or by a hydraulic motor. Commercially available large scale lithium-ion batteries are designed with proprietary cooling technologies which may include battery coolant flow through integrated cooling passages in the batteries, or which may include total immersion cooling of the batteries. Examples of battery coolants are dielectric liquids such as the Novec fluid available from the 3M Company and the Galden fluid available from the Solvay Company.

The refrigerant loop 94 is configured to flow a refrigerant through the second flow path 104 of the chiller 100 so that the refrigerant may further cool the coolant of the coolant loop 92. The refrigerant loop 94 includes a compressor 108 for circulating the refrigerant through the refrigerant loop 92. Compressor 108 may be driven by an electric motor or by a hydraulic motor. The refrigerant may be any suitable refrigerant fluid commonly used in air conditioning systems.

The cabin 60 of the electric work machine 20 may include a cabin air cooling system including a cabin cooling air heat exchanger 110 providing heat exchange relation between the refrigerant loop 94 and cabin air inside the cabin 60 to cool the cabin air. The cabin 60 may also include a cabin heating air heat exchanger 111 providing heat exchange relation between the coolant loop 92 and the cabin air inside the cabin 60 to heat the cabin air.

Refrigerant circulated by the compressor 108 may flow through an oil trap 112, a condenser heat exchanger 114, a drier 116, an expansion valve 118, then in parallel through the cabin air cooling heat exchanger 110 and chiller 100, then back to an intake side of the compressor 108. As schematically shown in FIGS. 4A and 4B the condenser heat exchanger 114 may be located within the battery housing 70 upstream of the fan 80 so that the fan 80 pulls air from passage 72 past the condenser heat exchanger 114 and the radiator 96.

Coolant circulated by the coolant pump 106 of the battery coolant loop 92 may flow through the chiller 100, then past the batteries 74A-74C. Coolant loop 92 shows the coolant from the batteries 74A-74C then flowing in parallel past the main electric motor 66, the power electronics component 65 and miscellaneous other powered accessories 122 to cool those components.

Then the coolant may flow in parallel past the cabin heating air heat exchanger 111 and an electric battery heater 124. Heat may be transferred from the coolant to cabin air flowing over the cabin heating air heat exchanger to heat the cabin air. Heat may be transferred from the battery heater 124 to the coolant to cool the battery heater 124. The battery heater 124 may be plugged into an external power source to electrically pre-heat the batteries 74A-74C to an operable temperature when the external ambient temperature is extremely low.

FIG. 5 then shows the coolant flowing through a remote preconditioning unit 126 then through the internal passage 98 of the radiator 96 and back to the intake of coolant pump 106. The remote preconditioning unit 126 may be used to inject hot coolant into the coolant loop 92 to warm up the various components of the coolant loop 92 from a cold starting condition.

Operational Modes:

As schematically shown in FIG. 3, the electric work machine 20 may include a controller 130 operably connected to the coolant pump 106, the compressor 108 and the fan 80, as well as other components of the electric work machine 20. As is further described below the controller 130 may be configured to provide:

A passive cooling mode including natural convection cooling of the batteries 74A-74C by ambient air;

A semi-passive cooling mode in which the fan 80 is operative to provide forced convection cooling by passing ambient air through the air passage 72 and across the radiator 96, and in which the coolant pump 106 is operative to move the battery coolant through the internal flow path 98 of the radiator 96 to cool the battery coolant; and An active cooling mode in which the compressor 108 is operative to circulate the refrigerant through the second flow path 104 of the chiller 100, and in which the coolant pump 106 is operative to move the battery coolant through the first flow path 102 of the chiller 100 to cool the battery coolant.

The controller 130 may monitor various parameters associated with the battery coolant loop.

A battery temperature sensor 132 may be located on one or more of the batteries 74A-74C and configured to sense a battery temperature. A battery temperature signal 132S representative of the battery temperature may be transmitted from the battery temperature sensor 132 to the controller 130. Of course, there may be multiple battery temperature sensors 132, one or more of which is associated with each of the batteries. The controller may monitor all of the battery temperature sensors and may control based upon a maximum battery temperature sensed at one of the multiple temperature sensors.

An ambient temperature sensor 134 may be configured to sense an ambient air temperature of the air outside of the battery housing 70. An ambient air temperature signal 134S may be transmitted from the ambient air temperature sensor 134 to the controller 130.

A battery coolant temperature sensor 136 may be configured to sense a battery coolant temperature. Preferably the battery coolant temperature sensor is located at the outlet of the coolant flow through the batteries 74A-74C as schematically illustrated in FIG. 5. A battery coolant temperature signal 136S may be transmitted from the battery coolant temperature sensor 136 to the controller 130.

The Passive Cooling Mode:

As noted above the controller 130 may be configured to provide a passive cooling mode including natural convection cooling of the batteries 74A-74C by ambient air. The controller 130 may further be configured such that the passive cooling mode is operative when none of the battery temperature, the ambient air temperature and the battery coolant temperature are greater than a first set point temperature. The first set point temperature may for example be 35 degrees Celsius (95 F). It is noted that in the passive cooling mode the controller 130 may not activate any of the fan 80, coolant pump 106 or compressor 108, but may simply allow natural convection cooling to take place through the air passage 72 without any further assistance.

The Semi-Passive Cooling Mode:

As further noted above the controller 130 may be configured to provide a semi-passive cooling mode in which the fan 80 is operative to provide forced convection cooling by passing ambient air across the radiator 96, and in which the coolant pump 106 is operative to move the battery coolant through the internal flow path 98 of the radiator 96 to cool the battery coolant. The controller 130 may further be configured such that the semi-passive cooling mode is operative when at least one of the battery temperature, the ambient air temperature and the battery coolant temperature is greater than the first set point temperature.

The controller 130 may be further configured such that the semi-passive cooling mode includes a first semi-passive phase and a second semi-passive phase. In the first semi-passive phase so long as the ambient air temperature is less than the first set point temperature the fan 80 is configured to provide forced convection cooling of the batteries 74A-74C by moving ambient air through the cooling passage 72 in heat exchange relation with the batteries 74A-74C. In the second semi-passive phase when the ambient air temperature is greater than the first set point temperature the fan 80 is configured to move a majority of the ambient air directly to the radiator 96 without the majority of the ambient air moving through the cooling passage 72 in heat exchange relation with the batteries 74A-74C. The second semi-passive phase minimizes the transfer of heat from ambient air to the batteries in situations where the ambient air temperature is extremely high. This second semi-passive phase may be accomplished by operating the upper fan unit 80.1 at a higher speed than the lower fan unit 80.2 so that ambient air is primarily drawn through the upper air opening 84 past the radiator 96 and out the exhaust outlet 86, and so that a relatively small amount or no ambient air is drawn through the end opening 82 into the air passage 72.

The Active Cooling Mode:

As further noted above the controller 130 may be configured to provide an active cooling mode in which the compressor 108 is operative to circulate the refrigerant through the second flow path 104 of the chiller 100, and in which the coolant pump 106 is operative to move the battery coolant through the first flow path 102 of the chiller 100 to cool the battery coolant. The controller 130 may further be configured such that the active cooling mode is operative when at least one of the battery temperature, the ambient air temperature and the battery coolant temperature are greater than a second set point temperature, the second set point temperature being greater than the first set point temperature. The second set point temperature may for example be 40 degrees Celsius (104 F).

The first set point temperature preferably is within a range of from 30 to 40 degrees C. (95 to 104 degrees F.) and the second set point temperature is preferably in a range of from 40 to 50 degrees C. (104 to 122 degrees F.).

It is noted that the active cooling mode is not exclusive of the semi-passive cooling mode. In the active cooling mode the fan may also remain operative to provide forced convection cooling by passing ambient air across the radiator 96. Thus, the operations described above for the semi-passive cooling mode in either its first semi-passive phase or its second semi-passive phase may continue, and the simultaneous operation of the active cooling mode will provide additional cooling.

The controller 130 may further be configured such that the active cooling mode is also operative when a cabin air cooling system is turned on and the cabin cooling air heat exchanger 110 is operative to cool the cabin air. It will be understood that the cabin air cooling system includes controls operative to activate the compressor 108 to circulate refrigerant through the refrigerant loop 94 and thus through the cabin cooling air heat exchanger 110 when there is a demand for cool air in the cabin 60.

Controller:

As schematically illustrated in FIG. 3, the electric work machine 20 includes a control system 128 including the controller 130. The controller 130 may be part of the machine control system of the electric work machine 20, or it may be a separate control module. The controller 130 may be mounted in the operator's cabin 60 at the control station 62. The controller 130 is configured to receive as input signals the battery temperature signal 132S, the ambient temperature signal 134S and the battery coolant temperature signal 136S as well as other information regarding the operation of the electric work machine 20. The signals transmitted from the various sensors to the controller 130 are schematically indicated in FIG. 3 by phantom lines connecting the sensors to the controller with an arrowhead indicating the flow of the signal from the sensor to the controller 130.

Similarly, the controller 130 will generate control signals for controlling the operation of the various motors or actuators, which control signals are indicated schematically in FIG. 3 by phantom lines connecting the controller 130 to the various motors or actuators with the arrow indicating the flow of the command signal from the controller 130 to the respective motor or actuator. It will be understood that the various actuators as disclosed herein may be hydraulic motors or may be hydraulic piston-cylinder units and that the electronic control signals from the controller 130 may actually be received by electro-hydraulic control valves 28V, 30V, 40V, 45V, 47V, 49V associated with the motors or actuators and the electro-hydraulic control valves will control the flow of hydraulic fluid to and from the respective hydraulic motors or actuators to control the actuation thereof in response to the control signals from the controller 130. As schematically illustrated in FIG. 3 those electro-hydraulic control valves may be 4-way/3-position spool valves.

Alternatively, the motors actuators may be electric motors or actuators. In such an embodiment the control signals from the controller 130 may activate relays and switches to direct electrical power to the electric motors or actuators to drive the motors or actuators in a desired direction at a desired speed.

The control signal communication lines are designated as 65C, 28C, 30C, 40C, 45C, 47C and 49C for communications with the power electronics component 65, and the control valves 28V, 30V, 40V, 45V, 47V and 49V, respectively. The control signal lines 80C, 106C and 108C represent control signals sent to the fan 80, the coolant pump 106 and the refrigerant compressor 108, respectively.

The control signals sent to the coolant pump 106 control the activation of and/or speed of the coolant pump 106. The control signals sent to the compressor 108 control the activation of and/or the speed of the compressor 108. The control signals sent to the fan 80 control the activation of and/or speed of the pump 80, and individually of the upper pump unit 80.1 and the lower pump unit 80.2. The control signals may be generated at least in part in response to one or more of the input signals 132S, 134S and 136S.

Controller 130 includes or may be associated with a processor 138, a computer readable medium 140, a data base 142 and an input/output module or control panel 144 having a display 146. The control panel 144 may be a part of the control station 62 in the cabin 60. An input/output device 148, such as a keyboard, joystick or other user interface, is provided so that the human operator may input instructions to the controller. It is understood that the controller 130 described herein may be a single controller having all of the described functionality, or it may include multiple controllers wherein the described functionality is distributed among the multiple controllers.

Various operations, steps or algorithms as described in connection with the controller 130 can be embodied directly in hardware, in a computer program product 150 such as a software module executed by the processor 138, or in a combination of the two. The computer program product 150 can reside in RAM memory, flash memory, ROM memory, EPROM memory, EEPROM memory, registers, hard disk, a removable disk, or any other form of computer-readable medium 140 known in the art. An exemplary computer-readable medium 140 can be coupled to the processor 130 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Figure 6:
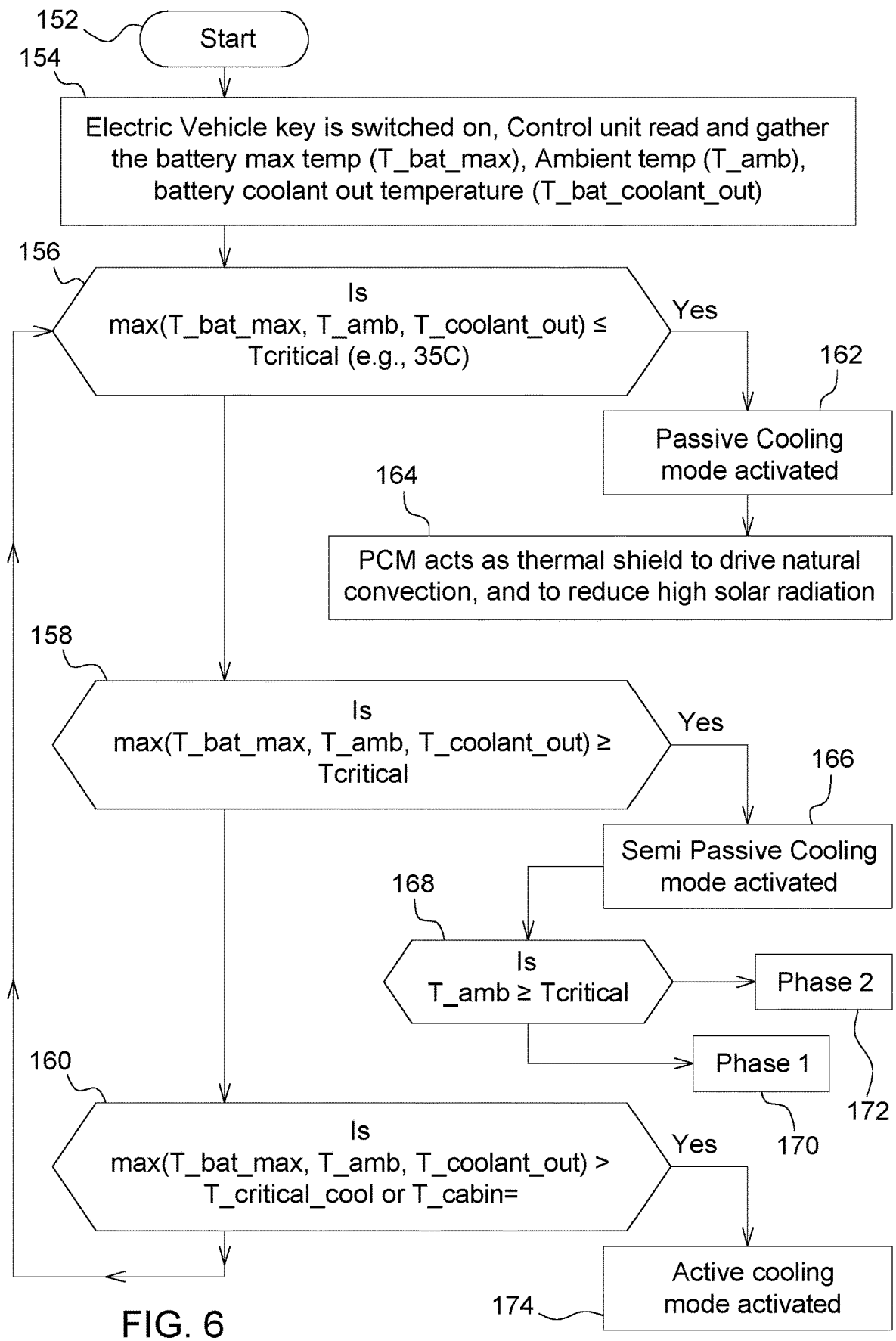
FIG. 6 is a flow chart showing one example of the manner in which the controller may select between the passive cooling mode, the semi-passive cooling mode and the active cooling mode.

An example of the computer program 150 to implement the three operational modes described above is schematically shown in the flow chart of FIG. 6.

The process may start as indicated at block 152. As indicated at the next block 154, when a key of the electric work machine 20 is switched on, the controller 130 may read the battery temperature via sensor 132, the ambient temperature via sensor 134 and the battery coolant temperature at the outlet of the batteries 74A-74C via sensor 136.

The controller will then in a repeating loop cycle through the queries shown in blocks 156, 158 and 160.

At block 156 the controller will determine whether all of the battery temperature, the ambient air temperature and the battery coolant temperature are less than the first set point temperature. This query may be made with the logic code "Is max(T_bat_max, T_amb, T_coolant_out)≤Tcritical". T_bat_max is the maximum battery temperature detected by sensor 132. T_amb is the ambient temperature detected by sensor 134. T_coolant_out is the battery coolant temperature detected at the outlet of the batteries 74A-74C via sensor 136. Tcritical refers to the first temperature set point, which may for example be 35 degrees C. If the answer is "YES" then the process passes to block 162 which places the system in the passive cooling mode. As further indicated at block 164, during the "Passive Cooling Mode" the phase change material 90 of the heat shield 88 may act to reduce heating of the batteries 74A-74C from solar radiation.

At block 158 the further query is made as to whether at least one of the battery temperature, the ambient air temperature and the battery coolant temperature are greater than the first set point temperature. This query may be made with the logic code "Is max(T_bat_max, T_amb, T_coolant_out)≥Tcritical." If the answer is "YES" then the process passes to block 166 which activates the semi-passive cooling mode.

As indicated at block 168, in the semi-passive phase the controller will further monitor the ambient temperature and if the ambient temperature is greater than the first set point the system will move from the first semi-passive phase of block 170 (schematically represented in FIG. 4A) to the second semi-passive phase of block 172 (schematically represented in FIG. 4B.)

At block 160 the further query is made as to whether at least one of the battery temperature, the ambient air temperature and the battery coolant temperature are greater than the second set point temperature. This query may be made with the logic code "Is max(T_bat_max, T_amb, T_coolant_out)≥T_critical_cool." T_critical_cool is the second temperature set point, which may for example be 40 degrees C. If the answer is yes, then the active cooling mode is activated as indicated at block 174. Block 160 may also inquire as to whether the cabin air cooling system has been turned on, in which case the active cooling mode is also activated. This query is represented in block 160 by the query "Is . . . Tcabin=" which inquires as to whether the cabin cooling system has been turned out to establish a set point for the cooling of the cabin air.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. An integrated vehicle and battery thermal management system for an electric work machine, comprising:
    a battery module including at least one battery and including an air passage configured to allow natural convection cooling of the battery by ambient air in the air passage in heat exchange relationship with the battery;
    a radiator including an internal flow path;
    a chiller including a first flow path and a second flow path in heat exchange relation with each other;
    a battery coolant loop configured to flow a battery coolant in heat exchange relation with the battery and through the internal flow path of the radiator and the first flow path of the chiller, the battery coolant loop including a coolant pump for circulating the battery coolant through the battery coolant loop;
    a refrigerant loop configured to flow a refrigerant through the second flow path of the chiller, the refrigerant loop including a compressor for circulating the refrigerant through the refrigerant loop;
    a fan configured to move ambient air across the radiator in heat exchange relation with the battery coolant in the internal flow path of the radiator;
    a controller operably connected to the coolant pump, the compressor and the fan, the controller being configured to provide:
        a passive cooling mode including natural convection cooling of the battery by ambient air in the air passage in heat exchange relationship with the battery;
        a semi-passive cooling mode in which the fan is operative to provide forced convection cooling by passing ambient air across the radiator, and in which the coolant pump is operative to move the battery coolant through the internal flow path of the radiator to cool the battery coolant; and
        an active cooling mode in which the compressor is operative to circulate the refrigerant through the second flow path of the chiller, and in which the coolant pump is operative to move the battery coolant through the first flow path of the chiller to cool the battery coolant.

2. The system of claim 1, further comprising:
    a battery temperature sensor configured to sense a battery temperature;
    an ambient temperature sensor configured to sense an ambient air temperature;
    a battery coolant temperature sensor configured to sense a battery coolant temperature; and
    wherein the controller is operably connected to the battery temperature sensor, the ambient temperature sensor and the battery coolant temperature sensor, and wherein the controller is further configured such that:
        the passive cooling mode is operative when none of the battery temperature, the ambient air temperature and the battery coolant temperature are greater than a first set point temperature:
        the semi-passive cooling mode is operative when at least one of the battery temperature, the ambient air temperature and the battery coolant temperature is greater than the first set point temperature; and
        the active cooling mode is operative when at least one of the battery temperature, the ambient air temperature and the battery coolant temperature are greater than a second set point temperature, the second set point temperature being greater than the first set point temperature.

3. The system of claim 2, wherein:
    the electric work machine includes a cabin and a cabin air cooling system including a cabin cooling air heat exchanger providing heat exchange relation between the refrigerant loop and cabin air inside of the cabin; and
    the controller is further configured such that the active cooling mode is also operative when the cabin air cooling system is operative to cool the cabin air.

4. The system of claim 2, wherein:
    the controller is further configured such that the semi-passive cooling mode includes:
        a first semi-passive phase wherein so long as the ambient air temperature is less than the first set point temperature the fan is configured to provide forced convection cooling of the battery by moving ambient air through the air passage in heat exchange relation with the battery; and
        a second semi-passive phase wherein when the ambient air temperature is greater than the first set point temperature the fan is configured to move a majority of the ambient air directly to the radiator without the majority of the ambient air moving through the air passage in heat exchange relation with the battery.

5. The system of claim 2, wherein:
    the first set point temperature is in a range of from 30 to 40 degrees C.; and
    the second set point temperature is in a range of from 40 to 50 degrees C.

6. The system of claim 1, wherein:
    the battery module further includes a heat shield located above the battery to shield the battery from direct solar radiation.

7. The system of claim 6, wherein:
    the heat shield includes a layer of phase change material configured to enhance cooling of the battery.

8. The system of claim 1, wherein:
    the battery extends along a battery length from a first battery end to a second battery end;
    the battery module includes an upper air opening communicating ambient air with the air passage, the upper air opening being closer to the first battery end than to the second battery end;
    the battery module includes a lower air opening communicating ambient air with the air passage, the lower air opening being closer to the second battery end than to the first battery end;

the fan is located in a direction of the battery length beyond the first battery end and closer to the upper air opening than to the lower air opening, and the fan includes an upper fan unit and a lower fan unit; and the controller is further configured such that in the semi-passive mode when an ambient air temperature is greater than the first set point temperature the upper fan unit is operated at a higher speed than the lower fan unit so that ambient air is primarily drawn to the radiator from the upper air opening rather than from the lower air opening.

9. The system of claim 1, wherein:

the electric work machine is an electric excavator including an undercarriage, a main frame mounted on the undercarriage to be pivotable about a vertical axis relative to the undercarriage, an excavator arm extending from a forward end of the main frame, and an operator's cabin located on the main frame;

the battery module is located on the main frame rearward of the operator's cabin and extending across a width of the main frame;

the fan is located adjacent a first module end of the battery module to draw air through the battery module;

the battery module includes an end opening to the air passage at a second module end of the battery module opposite from the first module end; and the battery module includes an upper air opening to the air passage closer to the first module end than to the second module end.

10. The system of claim 1, wherein:

the at least one battery includes a plurality of vertically stacked batteries and the air passage includes an air passage portion extending generally horizontally between adjacent vertically stacked batteries.

11. The system of claim 1, wherein:

the battery coolant loop is further configured to flow the battery coolant in heat exchange relation with an electric motor of the electric work machine to cool the electric motor.

12. The system of claim 11, wherein:

the battery coolant loop is further configured to flow the battery coolant in heat exchange relation with a power electronics component of the electric work machine to cool the power electronics component.

13. The system of claim 1, wherein:

the electric work machine includes a cabin and a cabin air heating system including a cabin heating air heat exchanger disposed in heat exchange relationship with the battery coolant loop to provide heat exchange relation between the battery coolant and cabin air to heat the cabin air.

14. An electric excavator, comprising:

an undercarriage;

a main frame mounted on the undercarriage to be pivotable about a vertical axis relative to the undercarriage;

an excavator arm extending from a forward end of the main frame;

an operator's cabin located on the main frame;

at least one battery;

a battery housing including an air passage configured to communicate the battery with ambient air to cool the battery, the battery housing being located on the main frame rearward of the operator's cabin and extending across a width of the main frame, the battery housing including a first housing end and a second housing end;

a fan located between the battery and the first housing end to move ambient air through at least a portion of the air passage;

wherein the second housing end includes an end opening to the air passage; and wherein the battery housing includes an upper air opening to the air passage closer to the first housing end than to the second housing end.

15. The electric excavator of claim 14, wherein:

the at least one battery includes a plurality of vertically stacked batteries and the air passage includes an air passage portion extending generally horizontally between adjacent vertically stacked batteries.

16. The electric excavator of claim 14, further comprising:

a heat shield located above the battery to shield the battery from direct solar radiation.

17. The electric excavator of claim 16, wherein:

the heat shield includes a layer of phase change material configured to enhance cooling of the battery.

18. The electric excavator of claim 14, further comprising:

a radiator, including an internal flow path;

a battery coolant loop configured to flow a battery coolant in heat exchange relation with the battery and through the internal flow path of the radiator;

wherein the fan includes an upper fan unit and a lower fan unit; and wherein the fan is configured such that when an ambient air temperature is greater than a set point temperature the upper fan unit may be operated at a higher speed than the lower fan unit so that ambient air is primarily drawn to the radiator from the upper air opening rather than from the end opening.

\* \* \* \* \*